United States Patent Office 3,114,751
Patented Dec. 17, 1963

3,114,751
AMIDES OF ADENINES
Richard R. Whetstone, Modesto, Calif., assignor to Shell Oil Company, New York, N.Y., a corporation of Delaware
No Drawing. Filed Mar. 31, 1960, Ser. No. 18,892
11 Claims. (Cl. 260—252)

This invention relates to a new class of amides which are of substantial value by reason of the fact that they are capable of markedly modifying the physiological processes of plant materials, thereby affecting the growth and decay characteristics of those materials.

These new amides are characterized by the combination of an acyl group bonded in amide configuration with a nitrogen atom of an adenine moiety, the nitrogen atom being the exocyclic nitrogen atom or a ring nitrogen atom at the 7- or 9-position of the adenine structure. Amides of this kind and their salts have been found to profoundly affect the physiological processes of plant materials. For example, it has been found that such amides markedly inhibit deterioration, loss of color, wilting, and loss of flavor of green plant materials and maintain the edibility of the green plant materials ordinarily consumed by humans or by animals. Further, such amides are of interest as growth modifiers for various living plants, including micro-plants such as algae and the like. These amides also are of interest in the preparation of useful pharmaceuticals.

The new amides are characterized by the following formulae:

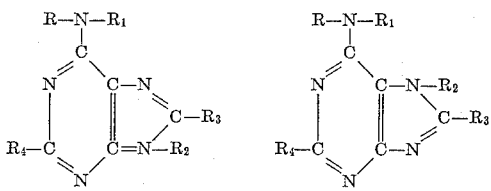

wherein at least one of $R_1$ and $R_2$ is an acyl radical, $R_3$ and $R_4$ are each a member of the group consisting of hydrogen and lower aliphatic radicals, R is a member of the group consisting of aryl radicals, araliphatic radicals, heterocyclic radicals and aliphatic radicals, with the proviso that when but one of $R_1$ and $R_2$ is acyl, the other is a member of the group consisting of hydrogen, lower aliphatic radicals, and heterocyclic radicals, and salts of said amides.

It is necessary to describe these compounds by means of two formulae because the adenines which may be considered to be, and in some cases may actually be, the progenitors of the compounds of the invention, have two tautomeric forms, as follows:

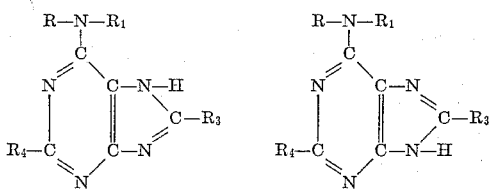

In forming the derivatives wherein $R_2$ is other than hydrogen, the group $R_2$ can be bonded to either the nitrogen atom in the 7-position, or to the nitrogen atom in the 9-position.

By "acyl" is meant the radical derived from an acid by removal of the hydroxyl group, the acid and the resulting acyl group being either organic or inorganic in character and containing, for example, up to 10 carbon atoms, or even more. In the case of a carboxylic acid, $R''$—C(O)—OH, the acyl radical is $R''$—C(O)—, while in the case of a sulfonic acid, $R''$—$SO_2$—OH, the acyl radical is $R''$—$SO_2$—, while in the case of an inorganic acid such as nitrous acid, HO—NO, the acyl radical is —NO. Suitably the acyl radical may be that of a lower aliphatic carboxylic acid or sulfonic acid, the intended meaning of aliphatic being set out hereinafter. Also suitably the acyl radical may be that of an aryl carboxylic or sulfonic acid, including those wherein the aryl group is substituted by one or more non-hydrocarbon substituents. The acyl radical suitably may also be that of a lower aliphatic carbonic acid ($R''$=lower aliphaticoxy), or an aryl carbonic acid ($R''$=aryl), an amino acid ($R''$=aminoalkylene, or preferably $(R_o)_2$N-alkylene wherein $R_o$ is hydrogen or $R''$), a carbamic acid ($R''$=amino, preferably $(R_o)_2$N—), phosphoric acid, a monoester or diester thereof (—P(O)(OR$_o$)$_2$), a phosphonic acid, a monoester or diester thereof $$(-P(O)(R'')(OR_o))$$

or a phosphinic acid (—P(O)(R'')$_2$), or their sulfur analogs, or boric acid or a mono- or diester thereof (—B(OR$_o$)$_2$). Because of the desirable properties of the resulting amides, it is preferred that the aliphatic radical or radicals of these acyl groups contain only carbon in the chain, and that they be either saturated or olefinically unsaturated, but not acetylenically unsaturated. The amides wherein the acyl group is that of an alkane monocarboxylic acid of up to six carbon atoms are of particular interest as plant material preservatives.

In this kind of compound, R can be aryl, for example, aryl of up to 10 carbon atoms, or even more, and suitably therefore can be phenyl, hydrocarbon-substituted phenyl—such as biphenylyl, or an aliphatic-substituted phenyl radical such as the mono- and poly(lower alkyl) phenyl radicals—or a phenyl radical substituted by one or more non-hydrocarbon substituents, or a naphthyl, anthryl or like polynuclear aromatic radical. Also, R can be araliphatic, for example, araliphatic of up to 10 carbon atoms, or even more, and therefore can be the benzyl radical, the alphamethylbenzyl radical, the phenethyl radical, the phenylbenzyl radical, mono- and poly(lower alkyl)benzyl radicals, or other hydrocarbon aralkyl radicals, or a cinnamyl, phenylvinyl, or like aralkenyl group, or R can be an araliphatic radical substituted by one or more non-hydrocarbon substituents, examples being the above-mentioned hydrocarbon araliphatic radicals containing one or more non-hydrocarbon substituents. The amides wherein R is an aralkyl radical in which the alkyl moiety is unsubstituted are of particular interest as plant material preservatives.

The radical R can suitably be a heterocylic radical, for example, containing up to 10 carbon atoms or even more, and in addition to carbon, the hetero ring or rings can contain one or more of oxygen, sulfur, nitrogen, phosphorus, boron, or other hetero atoms. Of particular interest are the amides wherein R is a monocyclic heterocyclic radical containing in the ring in addition to carbon a single hetero oxygen atom, examples being the furfuryl radical, pyranyl radicals, and cyclic forms of sugar radicals, such as the pentoses, particularly the riboses, and the hexoses, wherein the attachment of the radical is from a carbon atom of the ring thereof to the exocyclic nitrogen atom of the adenine structure.

R suitably can be an aliphatic radical, such as an aliphatic hydrocarbon radical, an aliphatic hydrocarbon radical substituted by one or more non-hydrocarbon substituents, or an aliphatic radical, as will be described in more detail hereinafter.

Where R represents a cyclic radical, or an aliphatic radical substituted by one or more non-hydrocarbon substituents, suitably each substituent may be one of: halogen atoms, particularly bromine or chlorine, lower alkyloxy radicals, the hydroxy radical, the carboxyl radical, lower alkyloxycarbonyl radicals, amino radicals (including —$NH_2$, and particularly the mono- and di(lower alkyl)amino radicals), the nitro radical, the cyano radical, the mercapto radical, lower alkylthio radicals and lower sulfonyl radicals. Those substituents containing oxygen are particularly of interest, since they tend to increase the water solubility of the amides containing them. Those amides wherein R is a lower molecular weight unsubstituted aralkyl, aryl or heterocyclic radical are of particular interest as plant material preservatives, those wherein R is benzyl, phenyl, furfuryl or a ribose radical being of most interest.

The radicals represented by $R_3$ and $R_4$ are either hydrogen or lower aliphatic, that is, containing up to 8 carbon atoms. The term "aliphatic" is herein intended to have its usual meaning: that is, an aliphatic radical is one which is essentially chain-like in configuration, as opposed to cyclic configuration. The aliphatic radicals represented by R, $R_3$ and $R_4$ thus can be aliphatic hydrocarbon, they can be substituted hydrocarbon, or they can be hetero, with atoms other than carbon in the essential chain, provided that their basic configuration is chain-like, and not cyclic. Where the aliphatic radical is hetero, the atom joining the group to the carbon atom of the adenine structure can be carbon, or it can be an atom other than carbon. R and/or $R_3$ and/or $R_4$ thus can represent an aliphatic hydrocarbon radical, such as an alkyl radical, an alkenyl radical, an alkynyl radical, an alkadienyl radical, or the like, and that radical can be of either straight-chain or branched-chain configuration. Likewise, R and/or $R_3$ and/or $R_4$ can represent one of such aliphatic hydrocarbon radicals which is substituted by a substituent such as a halogen atom, a cyano radical, a nitro radical, a carboxyl radical, a sulfonyl radical, a hydroxyl radical or a mercapto radical. Further, R and/or $R_3$ and/or $R_4$ can represent an aliphatic hetero radical, such as an alkylthio radical, an alkyloxy radical, an alkoxycarbonyl radical, an alkoxycarbonylalkyl radical, an alkylthioalkyl radical, an alkoxyalkyl radical, or the like. $R_3$ and/or $R_4$ can also represent an aralkyl radical. When one or more of R, $R_3$ and $R_4$ represent aliphatic radicals, the amides wherein the total number of carbon atoms in those radicals does not exceed ten, and wherein each of the aliphatic radicals represented by these symbols contains not more than eight carbon atoms are of particular interest as plant material preservatives. The amides of this invention wherein $R_3$ and $R_4$ represent hydrogen or an unsubstituted aliphatic hydrocarbon radical of from one to four carbon atoms include those which have the highest activity as plant material preservatives, those wherein the aliphatic hydrocarbon radical is alkyl being of particular interest.

Where but one of $R_1$ and $R_2$ is acyl, the other is hydrogen, a lower aliphatic radical, or a heterocyclic radical, the respective meanings of the terms "aliphatic" and "heterocyclic" being those already set out herein.

It is to be understood that while many of the amides described herein are active plant material preservatives, the activity of individual species of the amides will vary, particularly as regards different species of plant materials. By proper selection of the structure of the amide, it is possible to obtain one or more of these amides which will best preserve a given species of plant material. As a general rule, the plant preservative activity increases with decreasing molecular weight of the amide. For this reason, certain subgenera of the amides are of particular interest. These subgenera include: (a) that wherein R represents a lower molecular weight aryl, aralkyl or carbon-oxygen heterocyclic radical, particularly a phenyl, benzyl, furfuryl or 2-ribosyl radical, $R_1$ is a lower molecular weight acyl group, particularly the acyl group of an alkane monocarboxylic acid of up to 6 carbon atoms and the adenine ring is unsubstituted (all of $R_2$, $R_3$ and $R_4$ are hydrogen); (b) that wherein R is hydrogen, $R_1$ is unsubstituted lower alkyl, $R_2$ is a lower molecular weight acyl group, particularly the acyl group of an alkane monocarboxylic acid of up to 6 carbon atoms, and $R_3$ and $R_4$ are both hydrogen.

The amides contemplated by the invention are further illustrated by the following individual species thereof: $N^6$-benzyl-$N^6$-acetyladenine, $N^6$-benzyl-$N^6$-propionyladenine, $N^6$-phenyl-7-acetyladenine, $N^6$-benzyl-9-acetyladenine, $N^6$-benzyl-$N^6$-benzoyladenine, $N^6$-(1-napthyl)-$N^6$-nitrosoadenine, 6-(N-methyldimethylphosphoroamido)purine, $N^6$-(p-methylphenyl)-7-(methylsulfonyl)-adenine, $N^6$-benzyl-8-methyl-7-acetyladenine, $N^6$-phenyl-$N^6$-capryladenine, $N^6$-hexyl-8-methyl-7-acetyladenine, $N^6$-hexyl-8-methyl-9-acetyladenine, $N^6$-phenyl-$N^6$-pentyl-9-(propylsulfonyl)adenine, $N^6$-benzyl-$N^6$-nitroso-2-(pentylthio)adenine, and the like.

These amides, particularly those wherein $R_3$ is hydrogen, are amphoteric and form salts with both acids and bases. When the amide is to be used to preserve plant material, it may be found preferable to employ a salt of the particular amide, rather than the amide itself. This usually is the case where it is desirable to change the solubility of the amide.

These amides will form salts with acids generally. Thus, the salts of such inorganic acids as the halogen acids, particularly hydrochloric acid and hydrobromic acid, can be formed, as can the salts of such acids as sulfuric acid, phosphoric acid and boric acid. Both complete salts and partial salts can be formed. The salts of organic acids can also be formed, examples of suitable acids being the aliphatic mono- and polycarboxylic acids (the alkane mono- and dicarboxylic acids of up to ten carbon atoms are preferred), including those which are substituted—as for example the halogenated acids, hydroxy-substituted acids, and the like—alkane and aryl sulfonic acids, phosphonic acids, phosphinic acids, phosphorous acid and its partial esters and the like.

The salts of bases include those of inorganic, as well as organic bases. Salts of alkali metal bases and alkaline earth metal bases are particularly suitable, other salts of inorganic bases being the ammonia salts and salts of polyvalent metals. Salts of organic bases, such as the amines, particularly mono-, di- and trialkyl amines and mono-, di- and trialkanolamides, are suitable, as are quaternary ammonium salts, sulfonium salts, phosphonium salts, salts of hetero nitrogen bases, and the like.

The amides of this invention are most conveniently prepared by reacting the appropriate adenine compound with an acid chloride, acid or acid anhydride or salt to form the corresponding amide.

The adenines unsubstituted on the rings are known compounds which occur naturally and which have been synthesized by reaction of amines with 6-halopurines and by reaction of amines with 6-alkylthiopurine. Adenines substituted at the 9-(7-)position are readily prepared by reacting an alkali metal salt of the adenine with a halide of the desired substituent. Adenines substituted at the 2-position are readily prepared by reacting the appropriately 2-substituted 4,5,6-triaminopyrimidine with an acid or acid anhydride. Reaction of a 4,5,6-triaminopyrimidine with an appropriate acid or acid anhydride likewise prepares the desired 8-substituted adenine.

In effecting reaction of the adenine with the acid compound to form the amide, the acid compound is thoroughly mixed with the adenine and the mixture maintained at an appropriate temperature until the amidization is complete. In some cases, mild heating will be found necessary to complete the reaction within a reasonable time. In other cases, low temperatures will be required because of instability of a reactant. Where there is used an acid or an acid anhydride which is liquid, use of an excess thereof ordinarily will be found convenient to provide a readily fluid reaction medium.

Where a solid acid, anhydride or salt is involved, use of a suitable inert solvent is convenient. Where an acid halide is used, the reaction ordinarily is conducted in the presence of a hydrogen halide acceptor, pyridine being a convenient stable liquid for the purpose. The amide ordinarily is most conveniently recovered by treating the reaction mixture with water, then recovering the amide in solid form. In some cases it may be desirable to recover the amide in the form of a salt thereof, as for example, the sodium or acetic acid salt. The amide is most conveniently purified by crystallization techniques, since some of the amides tend to be somewhat unstable during distillation, even under reduced pressure.

The following examples illustrate the preparation of the amides of this invention by describing the preparation of individual, typical species of these amides.

EXAMPLE I.—$N^6$-BENZYL-$N^6$-ACETYLADENINE

A solution of 2 grams of $N^6$-benzyladenine in 20 milliliters of acetic anhydride was refluxed for three hours, the mixture was poured over ice and allowed to stand overnight to hydrolyze the excess acetic anhydride. The solid product was filtered and dried, giving 2.2 grams of tan crystals melting at 163–166° C., which were taken up in methanol, treated with charcoal and chilled to obtain nearly colorless crystals melting at 166–167° C.

*Analysis.*—Calculated: C—63.0%; H—4.9%; N—26.2%. Found: C—62.1%; H—5.4%; N—26.3%.

EXAMPLE II.—$N^6$-BENZYL-$N^6$-NITROSOADENINE

A solution of 4.5 grams of $N^6$-benzyladenine in 200 milliliters of 50% aqueous acetic acid was maintained at 15° C. during the addition of 2 grams of sodium nitrite dissolved in 10 milliliters of water over a period of 10 minutes. The mixture was allowed to come to room temperature and stand overnight. The solid that had separated was filtered, washed with water and dried. The yield of pale yellow product was 4.4 grams, M.P. about 226° C. with decomposition and gas evolution. The specific melting temperature depends somewhat on the heating rate.

*Analysis.*—Calculated: C—56.7%; H—3.9%; N—33.1%. Found: C—56.3%; H—4.0%; N—32.9%.

EXAMPLE III.—$N^6$-BENZYL-9-(METHYL-SULFONYL)ADENINE

A suspension of 2.25 grams of $N^6$-benzyladenine in 25 milliliters of pyridine was treated with 1.5 grams of methylsulfonyl chloride. The mixture warmed slightly and rapidly formed a clear solution. After about 5 minutes, the solution was poured into 200 milliliters of ice water. The product separated as fine needles, was filtered, washed with water and dried to yield 2.5 grams of product, melting point 153–154° C. Recrystallization from isopropyl alcohol gave colorless needles melting at 154° C., resolidifying and remelting at 163–164° C.

*Analysis.*—Calculated: N—23.1%; S—10.6%. Found: N—23.1%; S—11.0%.

EXAMPLE IV.—$N^6$-OCTYL-9-(METHYL-SULFONYL)ADENINE $N^6$-octyladenine and methylsulfonyl chloride were reacted in the same manner as $N^6$-benzyladenine and methylsulfonyl chloride described in Example III. The product was recrystallized from benzene-hexane and then twice from methanol to give the pure compound melting at 82–85° C. The yield of purified material was 50%.

*Analysis.*—Calculated: N—21.1%; S—9.6%. Found: N—21.6%; S—9.8%.

EXAMPLE V.—$N^6$-BENZYL-7-(p-TOLUENE-SULFONYL)ADENINE 4.5 grams of $N^6$-benzyladenine was suspended in 100 milliliters of pyridine. 3.8 grams of p-toluenesulfonyl chloride was added. A clear solution resulted. The solution was poured into 200 milliliters of ice water. 5.5 grams of solid, melting point 178–180° C., precipitated. The product was recrystallized from methyl alcohol. 5 grams of colorless needles, melting point 183° C., was obtained.

*Analysis.*—Calculated: N—18.5%; S—8.4%. Found: N—18.1%; S—8.4%.

$N^6$-benzyl-7-(p-toluenesulfonyl)adenine also can be prepared by mixing benzyl adenine and p-toluenesulfonyl chloride together and melting the mixture (at about 245° C.).

EXAMPLE VI.—$N^6$-BENZYL-$N^6$-BENZOYL-ADENINE 4.5 grams of $N^6$-benzyladenine, 4.4 grams of benzoic anhydride were heated at 145–55° C. for four hours. A hard glass was formed. This was dissolved in 150 milliliters of hot benzene. The solution was cooled and diluted with an equal volume of pentane. 5.2 grams of solid precipitated. This was recrystallized twice from methyl alcohol and water and twice from isopropyl alcohol. Yield: 1.5 grams of colorless needles melting at 204–5° C.

*Analysis.*—Calculated: C—69.3%; H—4.6%; N—21.3%. Found: C—68.6%; H—5.0%; N—21.0%.

Tests have been conducted which establish the effectiveness of the amides of the present invention in preserving fruits and vegetables, particularly green leafy vegetables. The following table summarizes the test wherein typical species of these amides were applied to freshly harvested radish foliage by dipping. The radish foliage was then stored in unperforated plastic bags for 3–5 days in the dark at 70° F. Tests were conducted at concentrations of 10 and 5 parts per million by weight (p.p.m.) of the test compound in the solution used. The concentration which gave the greatest percentage of green leaves after three days' storage is reported in the table.

*Percent of Green Foliage After Three Days of Storage at 70° F.*

Listed in order of estimated activity

| Name | Formulation | Concentration (p.p.m.) | Percent Green Foliage |
|---|---|---|---|
| Untreated | | | 10 |
| $N^6$-benzyl-$N^6$-nitrosoadenine. | 1 gram in 20 milliliters one normal sodium hydroxide. | 5 | 85 |
| $N^6$-benzyl-$N^6$-acetyladenine. | 1 gram in 5 milliliters acetic acid + 95 milliliters ethyl alcohol. | 5 | 80 |

$N^6$-octyl-9-(methylsulfonyl)adenine was also found to preserve the green leaves at a concentration of 1 gram in a mixture of 5 milliliters of acetic acid and 95 milliliters of ethanol, final concentration in solution: 5 parts per million by weight.

The reason for the effectiveness of these amides in preserving edibility and color of plant materials is not fully understood. It is believed, however, that they inhibit vegetable proteolysis. Though the exact mechanism is not known at this juncture, it is clear that the effect of these amides involves an intimate interaction of the chemical and plant material whereby preservation of plant materials is brought about. Because of the chemical interaction of these amides with vegetable material, it is now possible to use the products so formed in ways heretofore considered impossible. Hence after treatment the vegetable materials may be shipped or stored for significantly longer periods of time than heretofore considered possible without refrigeration without perceptible change in taste or other evidence of deterioration.

The amides of the invention may be formulated in a variety of ways. It is generally desirable that the amides be dissolved in a suitable solvent. Where the plant material to be preserved will be consumed by a human, or an animal, it is essential that the solvent be non-toxic and sufficiently volatile to evaporate from the plant within a reasonable time. The solvent of course should be inexpensive. In many cases, the alkali metal, particularly the sodium, salt of the amide is sufficiently soluble in water. In such cases, a solution of the salt may be used. In these or other cases, it may be more convenient to employ an acid salt which is soluble in a liquid other than water. For example, the salts of the amides with lower alkane carboxylic acids, particularly the acetic acid salts, are soluble in lower alcohols, particularly ethanol. In this latter, usually preferable, case, the amide is dissolved in at least sufficient acetic acid to form the salt (an excess of acid can be used, if desirable) and the solution is diluted with ethanol. Since some water can be present, aqueous acetic acid solutions can be used.

Alternatively, a solubilizing agent may be used, useful non-toxic solubilizing agents being the higher fatty acid monoesters of polyoxyethylene sorbitan, such as the monostearate ester, and mixtures of the monostearate and monopalmitate esters.

Emulsifiers also can be added to improve the wetting properties of the formulation. Suitable non-toxic emulsifiers include the higher fatty acid monoesters of polyoxyethylene sorbitan already described as solubilizing agent, or higher fatty and monoesters of glycerine, such as glyceryl monostearate and glyceryl monooleate.

The concentration of the compound may vary considerably. Five parts per million by weight (p.p.m.) is considered optimum though the compounds of the present invention are effective in more dilute concentrations such as 1 p.p.m. As a practical matter, 0.5 p.p.m., based on the weight of the fresh food product, is considered minimum, though more dilute concentrations also evidence effectiveness.

Since vegetables such as radishes and lettuce are sprayed or washed prior to packing it is preferred to contact them with an adenine derivative of the present invention at that stage. It will be understood, however, that if desired, the amides of the present invention may be sprayed or otherwise contacted with the vegetables at any time before harvesting, or between harvesting and consumption.

In other words, these amides may be sprayed or otherwise contacted with the vegetables or fruits, while in the field before picking, directly subsequent to picking but before packing, while in the conveyance which carries the edible vegetables or fruits to the packing house or during the packing operation. It is, of course, also possible to apply the amides at any time subsequent to the packing. It has been found generally preferable to treat the vegetables immediately before or after harvesting.

The amides can be used to preserve not only the above-mentioned vegetables but can be used to preserve edible vegetables and fruits generally.

These and/or others of the amides of the invention are also of interest for other purposes than as preservatives of plant materials, by reason of the fact that these compounds affect living plant life, including such micro-life as the algae, fungi and the like. These amides in some cases are of interest to promote the growth of plant life, while in other cases are of interest to inhibit the growth of plant life. Indeed, by controlling the concentration of the amide used, it is possible in many cases to determine whether a given amide will promote plant growth or inhibit it. In addition, the amides are of interest as intermediates to the preparation of compounds which are useful as pharmaceuticals, such as phosphatides, enzyme precursors and the like.

I claim as my invention:
1. $N^6$-benzyl-$N^6$-nitrosoadenine.
2. $N^6$-benzyl-$N^6$-acetyladenine.
3. $N^6$-octyl-9-(methyl sulfonyl)adenine.
4. $N^6$-benzyl-9-(methyl sulfonyl)adenine.
5. Amido-adenine compounds of the group consisting of amides of the formulae:

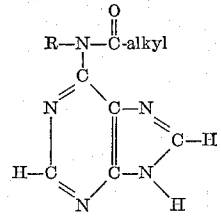

and

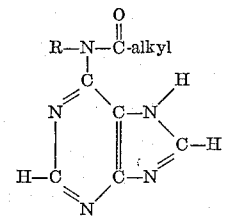

wherein R represents a member of the group consisting of the phenyl radical, the benzyl radical, the furfuryl radical and the 2-ribosyl radical, and "alkyl" represents an alkyl radical of from 1 to 6 carbon atoms.

6. Amido-adenine compounds of the group consisting of amides of the formulae:

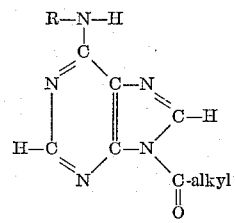

and

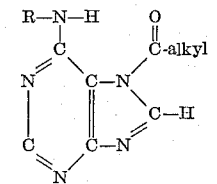

wherein R represents a member of the group consisting of the phenyl radical, the benzyl radical, the furfuryl radical and the 2-ribosyl radical, and "alkyl" represents an alkyl radical of from 1 to 6 carbon atoms.

7. Amido-adenine compounds of the group consisting of amides of the formulae:

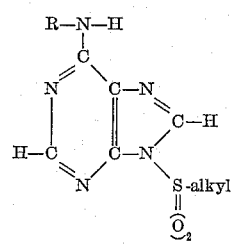

and

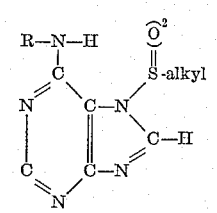

wherein R represents a member of the group consisting of the phenyl radical, the benzyl radical, the furfuryl radical and the 2-ribosyl radical, and "alkyl" represents an alkyl radical of from 1 to 6 carbon atoms.

8. Amido-adenine compounds of the formula

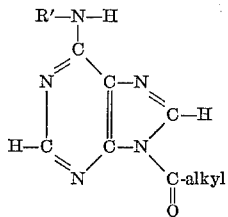

wherein R' represents an alkyl radical of from 1 to 10 carbon atoms, and "alkyl" in the formula is an alkyl radical of from 1 to 6 carbon atoms.

9. Amido-adenine compounds of the formula:

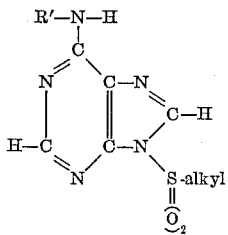

wherein R' represents an alkyl radical of from 1 to 10 carbon atoms, and "alkyl" in the formula is an alkyl radical of from 1 to 6 carbon atoms.

10. Amido-adenine compounds of the formula:

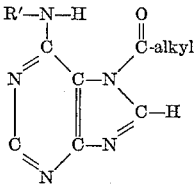

wherein R' represents an alkyl radical of from 1 to 10 carbon atoms, and "alkyl" in the formula is an alkyl radical of from 1 to 6 carbon atoms.

11. Amido-adenine compounds of the formula:

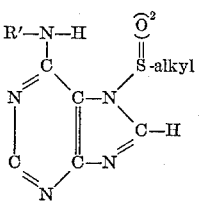

wherein R' represents an alkyl radical of from 1 to 10 carbon atoms, and "alkyl" in the formula is an alkyl radical of from 1 to 6 carbon atoms.

References Cited in the file of this patent

Levene: Jour. Biol. Chem., volume 121, pages 144–145 (1937).

Birkofer: Berichte Deutsche Chemische Gesellschaft, volume 76, pages 769–773 (1943).

Sorolla: Jour. Amer. Chem. Soc., volume 80, pages 3932–3937 (1958).